US009030956B2

(12) United States Patent
Siegel et al.

(10) Patent No.: US 9,030,956 B2
(45) Date of Patent: *May 12, 2015

(54) METHOD, COMPUTER-READABLE MEDIUM, AND APPARATUS FOR PROVIDING DIFFERENT SERVICES TO DIFFERENT USERS OF AN AGGREGATE ENDPOINT IN AN INTERNET PROTOCOL MULTIMEDIA SUBSYSTEM (IMS) NETWORK

(71) Applicant: AT&T Intellectual Property I, LP, Atlanta, GA (US)

(72) Inventors: Steven Alan Siegel, Mendham, NJ (US); Leticia Johnson, Helotes, TX (US); Nancy Lambros, Spicewood, TX (US); Stephanie Parlamas, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/762,548

(22) Filed: Feb. 8, 2013

(65) Prior Publication Data

US 2013/0148652 A1    Jun. 13, 2013

Related U.S. Application Data

(63) Continuation of application No. 12/609,167, filed on Oct. 30, 2009, now Pat. No. 8,386,640.

(51) Int. Cl.
*H04L 12/12* (2006.01)
*H04M 7/00* (2006.01)
*H04L 29/06* (2006.01)

(52) U.S. Cl.
CPC .......... *H04M 7/0093* (2013.01); *H04L 65/1016* (2013.01); *H04L 65/1053* (2013.01)

(58) Field of Classification Search
None
See application file for complete search history.

(56) References Cited

U.S. PATENT DOCUMENTS

| 7,188,167 | B2 | 3/2007 | Hallin | |
|---|---|---|---|---|
| 8,046,489 | B2 | 10/2011 | Blom et al. | |
| 8,386,640 | B2* | 2/2013 | Siegel et al. | 709/240 |
| 2002/0010771 | A1* | 1/2002 | Mandato | 709/223 |
| 2002/0126656 | A1* | 9/2002 | Park | 370/352 |
| 2006/0165060 | A1 | 7/2006 | Dua | |
| 2006/0270404 | A1* | 11/2006 | Tuohino et al. | 455/432.3 |
| 2007/0088836 | A1* | 4/2007 | Tai et al. | 709/227 |
| 2007/0238466 | A1 | 10/2007 | Buckley et al. | |
| 2007/0238467 | A1 | 10/2007 | Buckley et al. | |

(Continued)

OTHER PUBLICATIONS www.broadsoft.com; SIP Trunking for IP Multimedia Subsystem (IMS) Network, pp. 1-10 (Dec. 2008).

*Primary Examiner* — Marcus R Smith
*Assistant Examiner* — Duc Duong
(74) *Attorney, Agent, or Firm* — Gardner Groff Greenwald & Villanueva, PC

(57) ABSTRACT

Different services are provided to different users or groups of users of an aggregate endpoint in an internet protocol multimedia subsystem (IMS) network. The different users or groups of users are differentiated based on service profiles designated by different PUIDs for the different users or groups of users of each of the users or groups of users. Different services for transmission and/or receipt of packets for the different users or groups of users of the aggregate endpoint are provided, depending upon the differentiation between the different users or groups of users.

20 Claims, 6 Drawing Sheets

(56) References Cited

U.S. PATENT DOCUMENTS

| | | |
|---|---|---|
| 2007/0238468 A1 | 10/2007 | Buckley et al. |
| 2008/0176582 A1 | 7/2008 | Ghai et al. |
| 2008/0195535 A1* | 8/2008 | Liu .................................. 705/39 |
| 2008/0225760 A1* | 9/2008 | Iyer et al. ...................... 370/310 |
| 2008/0267170 A1 | 10/2008 | Allen et al. |
| 2009/0067408 A1 | 3/2009 | Leppainen et al. |
| 2009/0201917 A1 | 8/2009 | Maes et al. |
| 2009/0225670 A1* | 9/2009 | Leung et al. .................. 370/252 |
| 2009/0225688 A1* | 9/2009 | O'Neill ........................ 370/310 |
| 2009/0279545 A1* | 11/2009 | Moonen ........................ 370/389 |
| 2009/0298495 A1* | 12/2009 | Zhu et al. ...................... 455/433 |
| 2010/0008352 A1 | 1/2010 | Przybysz et al. |
| 2010/0100898 A1 | 4/2010 | Pfleging et al. |
| 2010/0216458 A1* | 8/2010 | Cai et al. .................... 455/432.3 |
| 2011/0026704 A1 | 2/2011 | Connelly et al. |
| 2012/0144049 A1* | 6/2012 | Lopez Nieto et al. ........ 709/228 |
| 2012/0265849 A1* | 10/2012 | Bakker et al. ................. 709/217 |
| 2013/0215882 A1* | 8/2013 | Siegel et al. .................. 370/352 |

* cited by examiner

SIP REGISTRAR

| PUID | P-CSCF | CONTACT | CAPABILITIES | Q VALUE | (DEVICE) |
|---|---|---|---|---|---|
| PUID-1 | P-CSCF-A | CELL PHONE ADDRESS | AUDIO; VIDEO | 1 | (CELL PHONE) |
| PUID-1 | P-CSCF-B | LAB PHONE ADDRESS | AUDIO | 2 | (LAB PHONE) |
| PUID-1 | P-CSCF-B | OFFICE PHONE ADDRESS | AUDIO | 3 | (OFFICE PHONE) |
| PUID-2 | P-CSCF-A | CELL PHONE ADDRESS | AUDIO; VIDEO | 4 | (CELL PHONE) |

FIG. 2

METHOD, COMPUTER-READABLE MEDIUM, AND APPARATUS FOR PROVIDING DIFFERENT SERVICES TO DIFFERENT USERS OF AN AGGREGATE ENDPOINT IN AN INTERNET PROTOCOL MULTIMEDIA SUBSYSTEM (IMS) NETWORK

BACKGROUND

Exemplary embodiments relate to providing services in a communication network, in particular an internet protocol multimedia subsystem network.

Today, Private Branch Exchanges (PBXs) generally receive undifferentiated trunk side services from service providers, and the PBXs provide all of the line side services themselves. In an Internet Protocol Multimedia Subsystem (IMS) network, in which IP multimedia services are delivered according to a standardized set of architecture specifications of the Third Generation Partnership Project (3 GPP) for providing mobile and fixed multimedia services, a PBX may need more differentiated services for both trunk side and line side services. For example, network-based Fixed Mobile Convergence (FMC) requires individual line side treatment for a subset of the users. Currently, PBXs are supported as aggregate endpoints receiving one set of services based on the PBX originating or terminating the call.

SUMMARY

It should be appreciated that this Summary is provided to introduce a selection of concepts in a simplifed form, the concepts being further described below in the Detailed Description. This Summary is not intended to identify key features or essential features of this disclosure, nor is it intended to limit the scope of the invention.

According to an exemplary embodiment, a method provides different services to different users or groups of users of an aggregate endpoint in an internet protocol multimedia subsystem (IMS) network. The method includes differentiating, at a server within the network, between the different users or groups of users of the aggregate endpoint based on identifier for each of the users or groups of users. The identifier indicates a service profile to be processed for each of the users or groups of users. The method further includes providing different services for transmission and/or receipt of packets for the different users or groups of users of the aggregate endpoint depending upon the differentiation between the different users or groups of users.

According to another embodiment, a computer readable medium has instructions encoded thereon for execution on a computer for differentiating between users or groups of users of an aggregate endpoint in an internet protocol multimedia subsystem (IMS) network. The instructions, when executed by the computer, cause the computer to differentiate between the different users or groups of users of the aggregate endpoint based on an identifier for each of the users or groups of users. The identifier indicates a service profile to be processed for each of the users or groups of users. Different services for transmission and/or receipt of packets are provided for the different users or groups of users of the aggregate endpoint depending upon the differentiation between the different users or groups of users.

According to another embodiment, an apparatus provides different services to different users or groups of users of an aggregate endpoint in an internet protocol multimedia subsystem (IMS) network. The apparatus includes an interface for receiving a message for a user or group of users, the message including an identifier identifying the user or group of users. The identifier indicates a service profile to be processed for the user or group of users. The apparatus further includes a processor for differentiating between the different users or groups of users of the aggregate endpoint based on the identifier and providing different services for transmission and/or receipt of packets for the different users or groups of users of the aggregate endpoint depending upon the differentiation between the different users or groups of users.

According to other embodiments, other methods, computer readable media, and/or devices according to various embodiments will be or become apparent to one with skill in the art upon, review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 2 illustrates a representation of an SIP Registrar included in an S-CSCF according to an exemplary embodiment.

DETAILED DESCRIPTION

Figure 1:
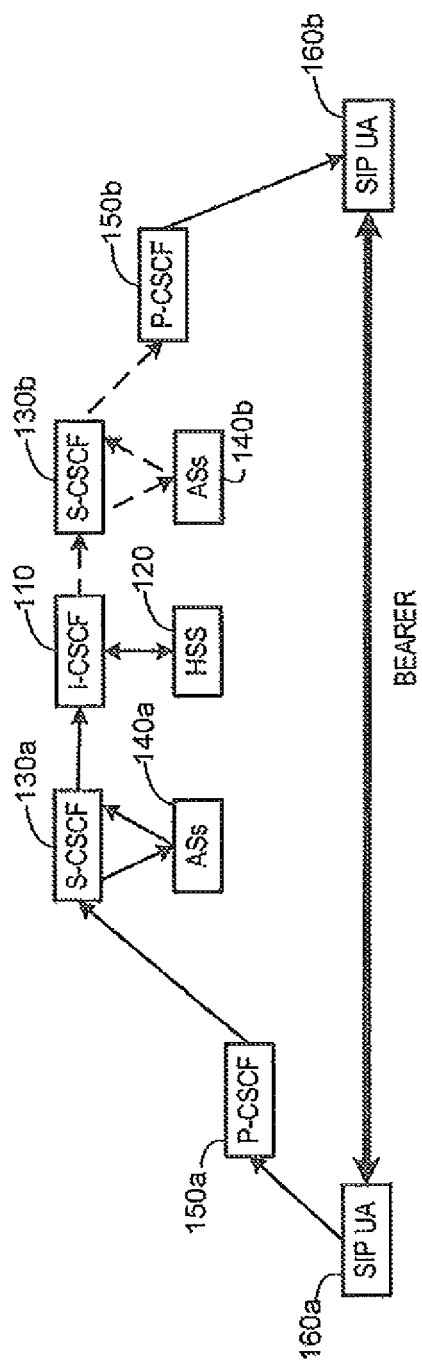
FIG. 1 illustrates an exemplary IMS network according to an exemplary embodiment.

Exemplary embodiments will be described more fully hereinafter with reference to the accompanying figures, in which embodiments are shown. This invention may, however, be embodied in many alternate forms and should not be construed as limited to the embodiments set forth herein.

Exemplary embodiments are described below with reference to block diagrams and/or flowchart illustrations of methods, apparatus (systems and/or devices) and/or computer readable media. It should be understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.) that runs on a processor such as a digital signal processor, collectively referred to as "circuitry" or "a circuit". Furthermore; exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate or transport the program for use by or in connection with the instruction execution system, apparatus, or device.

The computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

According to an exemplary embodiment, an IMS network can provide trunk-side aggregate endpoint services to Session Initiation Protocol (SIP) Private Branch Exchanges (PBXs) and can provide individual line side fixed mobile convergence services to individual users behind a PBX, e.g., an Internet Protocol (IP) PBX. A network may be provisioned for an Internet Protocol (IP) PBX end user providing some PBXs with Transit services, while the network may be provisioned to provide other PBXs with Serving Call Session Control Function (S-CSCF) based services. According to exemplary embodiments, some users or groups of users may be provided with individual line-side services, and other users/groups of users may be provided with different trunk side services, depending on the differentiation between the users/groups of users.

To illustrate the need for providing different services to users of the same aggregate endpoint, such an IP-PBX, consider a company that has several sites with IP-PBXs. The company decides that all of its sales force (spread across all the sites) should be FMC enabled so that each member of the sales force can use their mobile and wireline phones and also be provided with single number reach capabilities, abbreviated dealing, and common restriction treatment across wireline an wireless phones. The company also wants its executives (spread across all the sites) to be FMC enabled with enhanced capabilities, in addition to those provided to the sales force. In addition, the company wants to provide access to a network based address book service for all employees across all sites.

According to an exemplary embodiment, the needs of the company in the example described above may be met by treating different users/groups of users on the same IP-PBX differently for both originating and terminating services. Some users/groups of users may be provided with individual line-side services, and other users/groups of users may be provided with different trunk side services, depending on the users/group of users. Once there is differentiation between the users/groups of users, different trunk side services, e.g., different call screening rules, may be provided for different users or groups of users, e.g., executives, financial entities, sales representatives, etc.

FIG. 1 illustrates an exemplary IMS architecture including core elements coupled to aggregate endpoints. The core elements include an Interrogating Serving Call Session Control Function (I-CSCF) 110, a Home Subscriber Server 120, Serving Call Session Control Functions (S-CSCFs) 130a, 130b, Application Servers (ASs) 140a, 140b, and Proxy Call Session Control Functions (P-CSCFs) 150a, 150b. Aggregate Endpoints include SIP User Agents (UAs) 160a, 160b. When the served Aggregate Endpoint is 160a, it is represented as the originator of the session with another SIP User Agent 160b, which could be another Aggregate Endpoint or a single SIP endpoint. When the served Aggregate Endpoint is 160b, it is represented as the terminator of the session with another SIP User Agent 160a, which could be another Aggregate Endpoint or a single SIP endpoint. Although shown separately for ease of explanation, the SIP UAs 160a, 160b may be included as part of IP-PBXs (not shown for simplicity of illustration). The SIP UAs 160a, 160b are logical network end-points used to create or receive SIP messages and thereby manage a SIP session. SIP messages may be used to set up phone calls, provide multimedia sessions, and/or carry messages between users (IP messaging). The bearer shown in FIG. 1 represents the physical channel/bandwidth over which messages are transmitted.

For illustrative purposes, FIG. 1 depicts a message flowing from SIP UA 160a to SIP UA 160b via various core elements. It will be appreciated, however, that SIP messages may flow in the opposite direction, i.e., from SIP UA 160b to SIP UA 160b. Further, it will be appreciated that there may more than two SIP UAs and more core elements than those illustrated.

Upon receipt of an SIP request to relay a message or call, the I-CSCF 110 queries the HSS 120 to retrieve information identifying the S-CSCF which handles calls to the end user identified by the PUID in the Request URI of the message being routed. The I-CSCF 110 uses the response from the HSS 120 to route the message to the appropriate S-CSCF. The S-CSCF's handle SIP registration via an SIP Registrar, described in detail below with reference to FIG. 2. The S-CSCF's 130a, 130b, communicate with Application Servers (AS's) 140a, 140b and Proxy Call Session Control Functions (P-CSCFs) 150a, 150b. The AS's 140a, 140b host and execute services for messages (also referred to herein as calls) routed to them. The P-CSCF's 150a, 150b route packets to the SIP UAs 160a, 160b and screen messages coming in from the SIP UAs 160a, 160b before allowing them to enter the network. According to an exemplary embodiment, the P-CSCF's

150*a*, 150*b* are the border controllers between the SIP UAs 160*a*, 160*b* and the IMS core elements. The S-CSCF 130*b* includes the SIP Registrar for SIP UA 160*b* and therefore knows how to route to SIP UA 160*b*. S-CSCF 130*b* also retrieves in advance or can retrieve the service profiles associated with the destination PUID, enabling it to route the message via the appropriate AS 140*b*.

According to an exemplary embodiment, the S-CSCFs 130*a*, 130*b* determine what services to provide to end users and how to route messages or calls based on service profiles associated with the PUIDs of the users. The I-CSCF 110 uses the information stored in the HSS 120 to route the calls to the S-CSCF's 130*a*, 130*b*. The S-CSCF's 130*a*, 130*b*, in turn, determine where to route messages for different users and/or groups of users by differentiating between users/groups of users based on an identifier in a header of the message. According to an exemplary embodiment, the identifier may be a PUID which may be used by the S-CSCF to determine which service profile to process and which SIP Registrar registration to use in routing the message to the destination. Based on this differentiation, messages are routed through the AS's 140*a*, 140*b* (or different AS's) and/or to the P-CSCF's 150*a*, 150*b* (which, in turn route the messages to the SIP UAs 160*a*, 160*b*, respectively).

According to exemplary embodiments, the S-CSCF's 130*a*, 130*b* process messages using a service profile based on the PUID. When this PUID is changed, the S-CSCF may either process the new service profile associate with the new PUID or sent the message to an S-CSCF the at processes the new PUID. It should be appreciated that multiple PUIDs may point to eh the same service profile but there may be different routing rules (also referred to as registrations) in the SIP Registrar for the multiple PUIDs. This allows groups of users to be defined to enable them to have the same network services despite being on different aggregate endpoints, e.g., different IP-PBXs.

Although not depicted in FIG. 1 for simplicity of illustration, a Transit Function may play a similar role as an S-CSCF, supplying simpler services. In this scenario, more complex services may be provided by the aggregate endpoint.

In the example shown in FIG. 1, the message is routed from S-CSCF 130*a*, which may considered the originating S-CSCF, to S-CSCF 130*b*, which may be considered the terminating S-CSCF. In this example, the S-CSF 130 gets packets from the P-CSCF 150*a* and sends them on to, e.g., the I-CSCF 110 for terminating call treatment. This may occur directly, through border elements or via a Breakout Gateway Control Function (BGCF) to another network, such as a circuit-switched network. The terminating S-CSCF receives packets from the I-CSCF 110 (which may have gotten these packets from another S-CSCF, from a Transit Function or form a border element, processes the packets, and sends them on to the terminating UA, e.g., the SIP UA 160*b*, via a P-CSCF, e.g., P-CSCF 150*b*. The SIP UA 160*b* in the example shown in FIG. 1 may be considered an aggregate endpoint.

The various network elements described above may be implemented with a server including, e.g., a memory, a processor, and an operating system described in more detail below with reference to FIG. 6.

FIG. 2 illustrates a representation of an SIP Registrar included in an S-CSCF. The SIP Registrar may be included, e.g., in a memory in the S-CSCF. The SIP Registrar includes a Public User Identifier (PUID) or IM Public User Identification (IMPU) for each end user. The PUIDs identify the end users or groups of end users. When a user registers with the S-CSCF, the PUID of the user is bound to a specific SIP UA at a specific network location, e.g., an IP address, device. Examples of devices may include a cell phone, a lab phone, laptop, set top box and an office phone. A priority ("q" value) is assigned and capabilities (e.g., audio, video) are also bound to the registration for that user. The P-CSCF that is the first point of contact with the user is also included in the registration for the user.

In the example shown in FIG. 2, if a user wants all incoming calls to a specific PUID to go to voicemail, the user may de-register the PUID. If the user wants calls to a specific PUID to ring the office phone and lab phone simultaneously, and then, if neither picks up, ring the cell phone, the user may register the PUID at the office phone address and lab phone address with one q value (e.g., 2) and register the PUID at the cell phone address with a lower q-value (e.g., 1). If the user wants calls including audio/video only on the cell phone, the user may register audio/video capabilities only for the cell phone. If the user wants all personal calls to go to the cell phone and be treated separately from business calls, the user may register the personal calls PUID (e.g., PUID2) only the cell phone.

According to exemplary embodiments, the S-CSCFs 130*a*, 130*b* receive the service profile for each user from the HSS 110 over, e.g., a 3GPP defined Cx interface. Each service profile includes zero or more initial filter criteria which designate ASs that should be involved in a call and conditions indicating whether or not they are included. For each AS listed in the service profile, the S-CSCF 130*a* or 130*b* evaluates conditions and, if appropriate, sends the initial SIP Message to the AS 140*a* and/or 140*b* with instructions to return it when finished processing the message.

Figure 3:
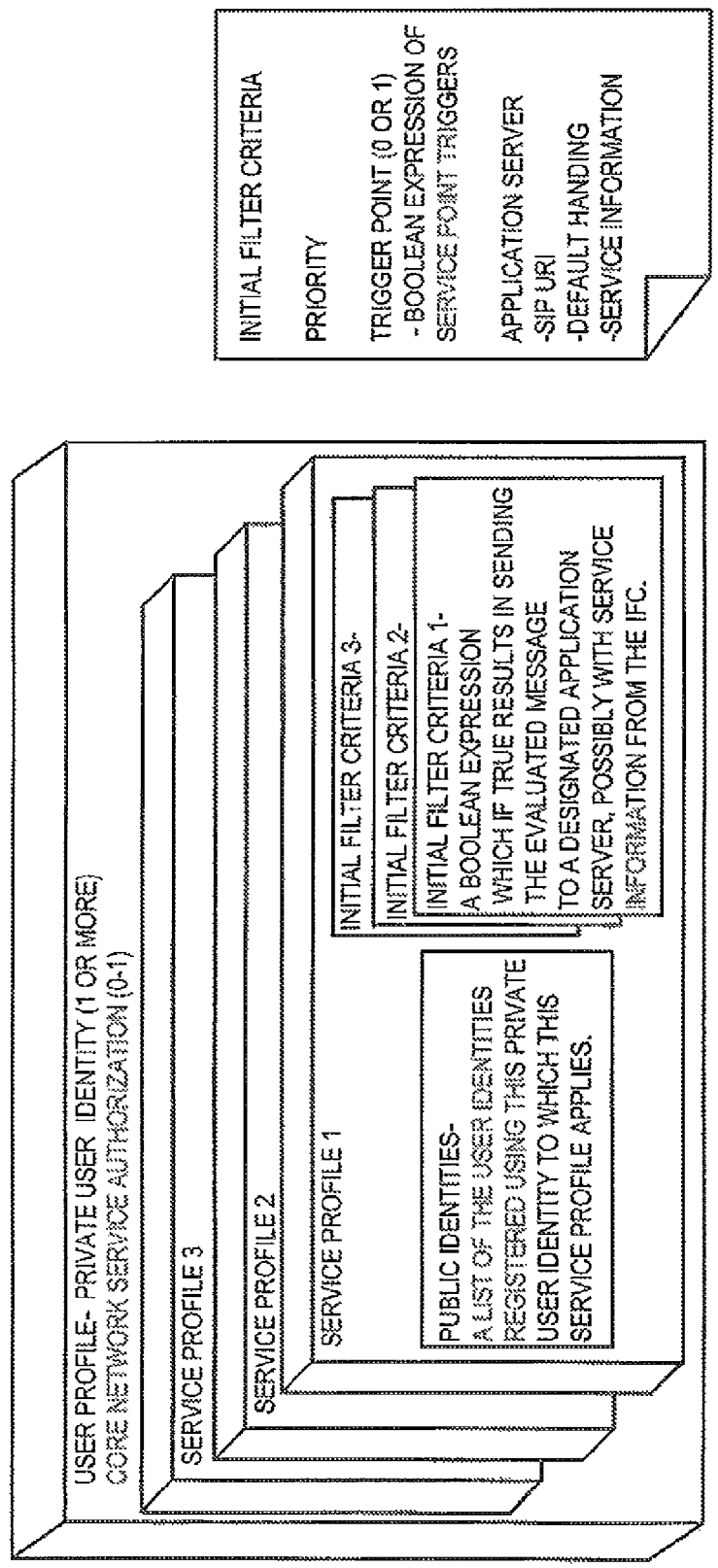
FIG. 3 illustrates how service profiles are associated with PUIDs and URIs according to an exemplary embodiment.

FIG. 3 illustrates how PUIDs, URIs, and service profiles may be associated according to an exemplary embodiment. As mentioned above, the service profiles are obtained from the HSS 110. The service profiles are associated with the PUIDs in the S-CSCFs 130*a*, 130*b*. Thus, the S-CSCFs 130*a*, 130*b* evaluate the service profile and determine whether to send the call to an AS and/or how to route the call. Each resource of a SIP network, such as a UA, is identifiable by a Uniform Resource Identifier (URI).

Figure 4:
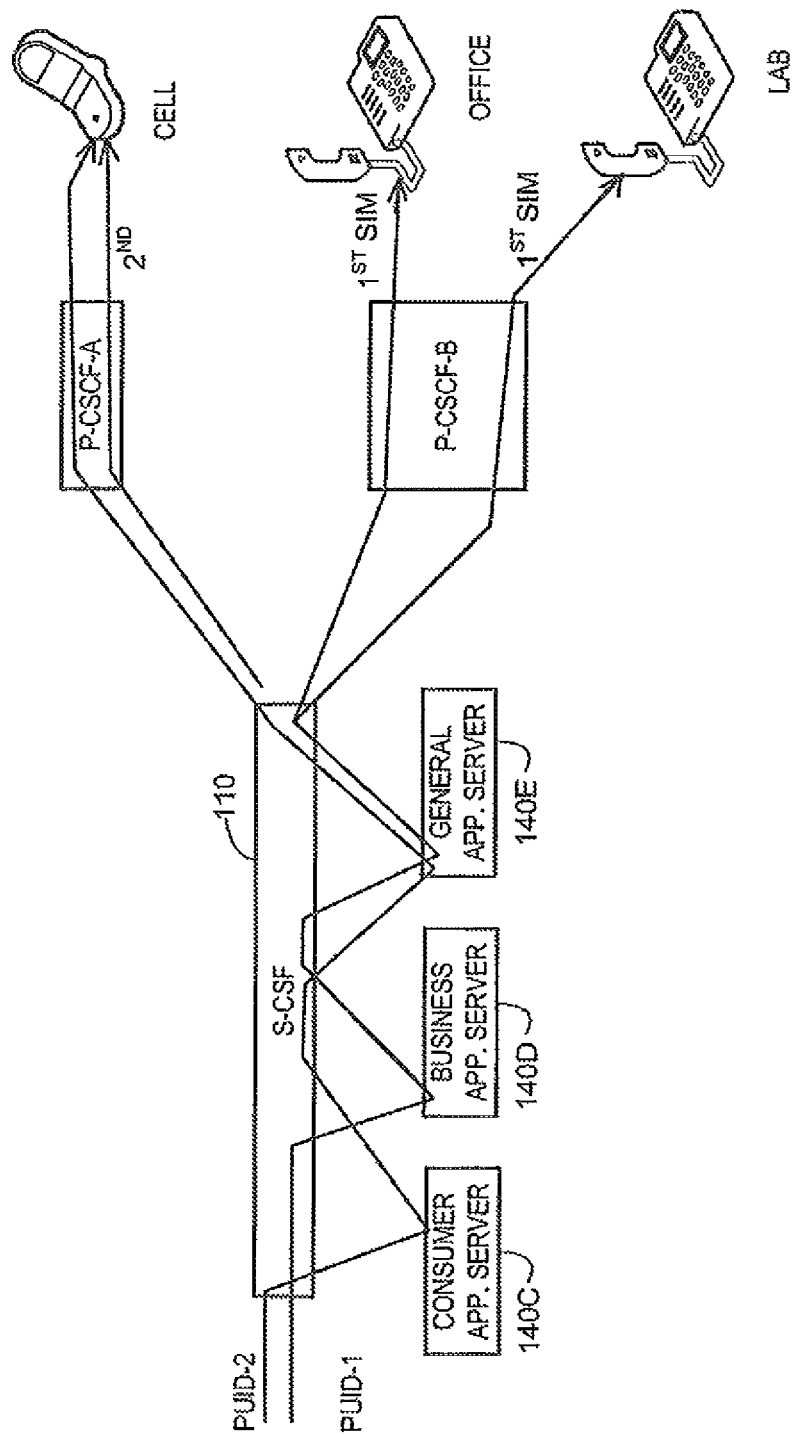
FIG. 4 illustrates an exemplary flow of a communication through elements of an IMS network according to an exemplary embodiment.

FIG. 4 illustrates an exemplary flow of a call through an IMS network to end users. Various elements of the IMS network have been omitted in this figure for ease of explanation. Calls to users, identified by PUID1 and PUID2, are evaluated by the terminating S-CSCF 130 which differentiates between the users based on the service profiles and provides different service to the users, accordingly. For example, a call from the user identified by PUID1, which may be a business call, is routed to the business application server 140*d*, returned to the S-CSCF 130, routed to the general application server 140*e*, returned to the S-CSCF 130, and then is delivered first to P-CSCF B. P-CSCF B simultaneously delivers the call to an office phone and a lab phone (via other elements not shown for ease of illustration). If there is no answer at the office phone or lab phone, the call from the user identified by PUID1 is then delivered to a cell phone via PCSCF-A. As another example, a call from a user identified by PUID2, which may be a personal call, is routed from the S-CSCF 130 to a consumer application server 140*c*, returned to the S-CSCF 130, routed to the general application server 140*e*, returned to the S-CSCF 130, and delivered to a cell phone via the P-CSCF-A (via other elements omitted for ease of illustration).

According to an exemplary embodiment, different users or groups of users of an aggregate endpoint may be provided with different services by differentiating between the users/ groups of users. Also, different groups of users may be defined to be provided with the same network services though the users are served by different aggregate endpoints. This differentiation capability may be provided for in the IMS network in various ways. Some information provided by the IP-PBX may be used by the network to enable the differentiation. According to one approach, the IP-PBX may provide a header that indicates to the network (e.g., the S-CSCF) the types of service to be provided. For example, route headers may be provided to distinguish between S-CSCF based services and Transit Function (TF) based services, a new P-Header may be provided containing the PUID that is to be processed, such that different services are provided depending on the PUID, etc. In this scenario, the IP-PBX may provide the line side information including, e.g., the calling party identity, P_Asserted_Identity, which is a SIP URI/PUID representing the originator of the call session, for any user receiving line services. Calling party information, or the lack of it, can be used to determine which set of trunk-side services to provide. For calls to the IP-PBX, differentiation may be based on the dialed number in a Request URI. Some R-URIs may be provided with line side services. Different groups of PUIDs may be provided with different trunk-side services.

According to exemplary embodiments, packets included in a message or call may be labeled to enable differentiation between users/user groups. For messages originating from an aggregate endpoint, this labeling may occur at the aggregate endpoint by labeling the packets in a message header and sending them forward appropriately, by labeling packets at an entry point in the network, such as a P-CSCF or Session Border Controller, or by labeling packets at an AS acting as a back to back user agent (changing the headers to invoke different service profiles). For messages terminating at an aggregate endpoint, this labeling may be done at an AS or by a Transit Function (determining which messages it does not treat, labeling those, and sending them on for treatment). This labeling may be done by changing the PUID of the packets in the message header and thereby changing the service profile processed by the S-CSCF, how ASs deliver services and how the entries in the SIP Registrar are used to locate the destination SIP UA.

Thus, according to exemplary embodiments, PUIDs in various header fields in initial SIP messages are used to determine or indicate the service profile processed by the S-CSCF (which in turn determines which Application Servers get involved), to determine the actual processing of the message by one or more Application Servers (such that different end users may be provided with different services) and to determine the final routing by the S-CSCF to the user agent (either the end user of the IP-PBX) by the S-CSCF using its SIP Registrar functionality.

Figure 5:
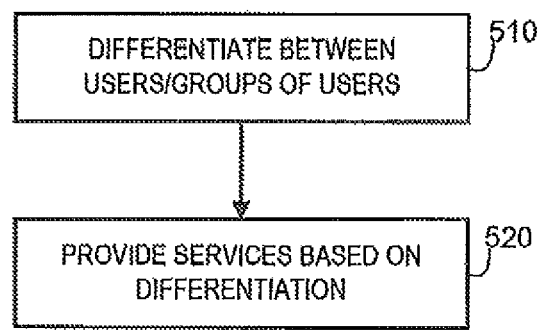
FIG. 5 is a flowchart illustrating an exemplary process for differentiating between different users or groups of users according to an exemplary embodiment.

FIG. 5 is a flowchart illustrating a method for providing different services to different users or groups of users of an aggregate endpoint in an internet protocol multimedia subsystem (IMS) network. It should be appreciated that the order of steps shown in FIG. 5 is provided for illustrative purposes. At step 510, a server within the network, such as a S-CSCF, differentiates between the different users or groups of users of the aggregate endpoint based on the PUID, which indicates the service profile to be processed for each of the users or groups of users. At step 520, different services for transmission and/or receipt of packets are provided for the different users or groups of users of the aggregate endpoint depending upon the differentiation between the different users or groups of users.

Figure 6:
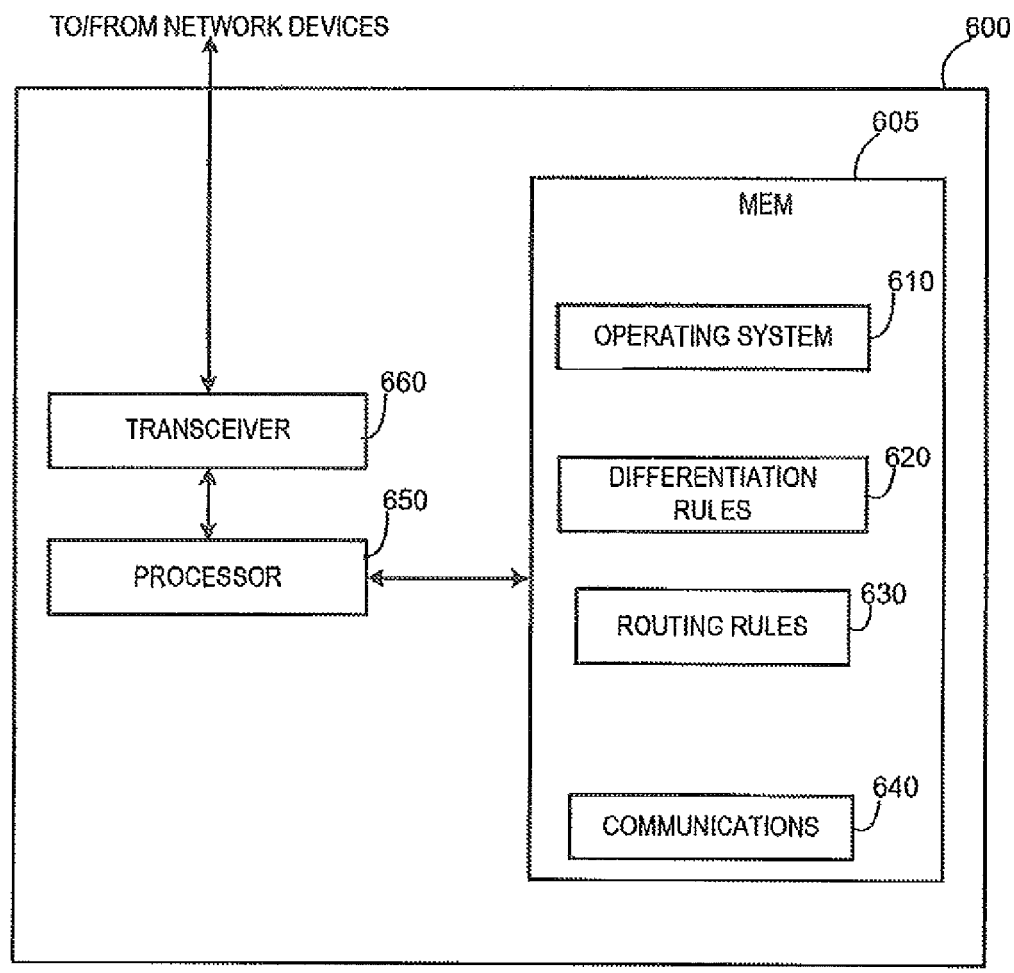
FIG. 6 illustrates an apparatus for differentiating between different groups of users according to an exemplary embodiment.

FIG. 6 illustrates an exemplary apparatus for differentiating between different users or groups of users. The apparatus 600 includes a processor 650, a transceiver 660, and a memory 605. The processor 625 communicates with the memory 605 via an address/data bus. The processor 625 may be, for example, a commercially available or custom microprocessor. The memory 605 is representative of the one or more memory devices containing the software and data used to facilitate differentiation between users/group of users in accordance with some embodiments. The memory 605 may include, but is not limited to, the following types of devices: cache, ROM, PROM, EPROM, EEPROM, flash, SRAM, and DRAM. The transceiver 660 acts as an interface and includes a transmitter circuit and a receiver circuit, which are used to establish and maintain communication with other devices, such as an I-CSCF, an HSS, an AS, and/or a P-CSCF.

As shown in FIG. 6, the memory 605 may contain multiple categories of software and/or data: an operating system 610, a communications module 640, a differentiation rules module 620, and a routing rules module 630. The operating system 610 generally controls the operation of the differentiation rules module 620 for differentiating between users/groups of users based on the PUID in a header and the routing rules module 630 for routing of a message based on a registration. In particular, the operating system 610 may manage the software and/or hardware resources of the differentiation rules module 620 and the routing rules module 630 and may coordinate execution of differentiation and routing programs by the processor 625. The communications module 640 may be configured to manage the communication protocols, including both wireless and wireline protocols, that may be used by the transceiver 660 to communicate with other devices in the IM network. The communication protocols may include, but are not limited to TCP/IP, H.323, etc. The communications module 640 may control conversion of signals received in one type of communication protocol into an appropriate format/ protocol for transmission to other devices.

Although FIG. 6 illustrates an exemplary apparatus for differentiating between users/groups of users in accordance with some embodiments, it will be understood that the present invention is not limited to such a configuration but is intended to encompass any configuration capable of carrying out operations described herein.

Computer program code for carrying out operations of devices, terminals, and/or systems discussed above with respect to FIGS. 1-6 may be written in a high level programming language, such as Java, C, and/or C++, for development convenience. In addition, computer program code for carrying out operations of embodiments may also be written in other programming languages, such as, but not limited to, interpreted languages. Some modules or routines may be written in assembly language or even micro code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to message flow, flowchart and/or block diagram illustrations of methods, devices, and/or computer program products. These message flow, flowchart and/or block diagrams further illustrate exemplary operations for performing file retention in accordance with various embodiments. It will be understood that each message/block of the message flow, flowchart and/or block diagram illustrations, and combinations of messages/blocks in the message flow, flowchart and/ or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method, comprising:
    differentiating, by a call session server within an internet protocol multimedia subsystem network, between different users of an aggregate endpoint based on an identifier for each of the users, wherein the identifier is associated with a priority value assigned to each device associated with each of the users and indicates a service profile including contact information, device address, and device capabilities for each device associated with each of the users;
    obtaining, by the call session server, the indicated service profile from a home subscriber server, the service profile further including filter criteria designating conditions under which particular application servers should be involved in transmission and/or receipt of packets for each of the users;
    determining, by the call session server, different services to provide for the different users of the aggregate endpoint depending upon the differentiating between the different users based on the identifier and the indicated service profile; and
    determining, by the call session server, routing for transmission and/or receipt of packets for the different users depending upon the differentiating between the different users based on the identifier, the indicated service profile, and the associated priority value, including evaluating the conditions designated by the filter criteria included in the indicated service profile and, based on the evaluating, sending a session initiation protocol message to a particular application server and instructing the particular application server to return the session initiation protocol message when the particular application server finishes processing the session initiation protocol message.

2. The method of claim 1, wherein the identifier upon which the differentiating between different users is based is included in a packet header.

3. The method of claim 2, wherein services are provide on a per-user basis.

4. The method of claim 2, wherein for a message originating at the aggregate endpoint, the identifier is placed into the packet header by the aggregate endpoint.

5. The method of claim 2, wherein for a message originating at the aggregate endpoint, the identifier is placed in the packet header by an entry point into the network.

6. The method of claim 2, wherein for a message originating at the aggregate endpoint, the identifier is placed into the packet header by an application server.

7. The method of claim 2, wherein for a message terminating at the aggregate endpoint, the identifier is included in the packet header at an application server.

8. A non-transitory computer readable storage medium having stored thereon computer-executable instructions that, when executed by a processor, cause the processor to perform operations comprising:
    differentiating between different users of an aggregate endpoint based on an identifier for each of the users, wherein the identifier is associated with a priority value assigned to each device associated with each of the users and indicates a service profile including contact information, device address, and device capabilities for each device associated with each of the users, the indicated service profile being obtained by a call session server from a home subscriber server within an internet protocol multimedia subsystem network, and the indicated service profile further including filter criteria designating conditions under which particular application servers should be involved in transmission and/or receipt of packets for each of the users;
    determining different services to provide for the different users of the aggregate endpoint depending upon the differentiating between the different users based on the identifier and the indicated service profile; and
    determining routing for transmission and/or receipt of packets for the different users depending upon the differentiating between the different users based on the identifier, the indicated service profile, and the associated priority value, including evaluating the conditions designated by the filter criteria included in the indicated service profile and, based on the evaluating, sending a session initiation protocol message to a particular application server and instructing the particular application server to return the session initiation protocol message when the particular application server finishes processing the session initiation protocol message.

9. The non-transitory computer readable storage medium of claim 8, wherein the identifier upon which the differentiating between different users is based is included in a packet header.

10. The non-transitory computer readable storage medium of claim 9, wherein services are provide on a per-user basis.

11. The non-transitory computer readable storage medium method of claim 9, wherein for a message originating at the aggregate endpoint, the identifier is placed into the packet header by the aggregate endpoint.

12. The non-transitory computer readable storage medium of claim 9, wherein for a message originating at the aggregate endpoint, the identifier is placed into the packet header by an entry point into the network.

13. The non-transitory computer readable storage medium claim 9, wherein for a message originating at the aggregate endpoint, the identifier is placed into the packet header by an application server.

14. The non-transitory computer readable storage medium method of claim 9, wherein for a message terminating at the aggregate endpoint, the identifier is included in the packet header at an application server.

15. An apparatus, comprising:
- a processor; and
- a memory having stored thereon computer-executable instructions that, when executed by the processor, cause the processor to perform operations comprising:
  - differentiating between different users of an aggregate endpoint based on an identifier for each of the users, wherein the identifier is associated with a priority value assigned to each device associated with each of the users and indicates a service profile including contact information, device address, and device capabilities for each device associated with each of the users, the indicated service profile being obtained by a call session server from a home subscriber server within an internet protocol multimedia subsystem network, and the indicated service profile further including filter criteria designating conditions under which particular application servers should be involved in transmission and/or receipt of packets for each of the users;
  - determining different services to provide for the different users of the aggregate endpoint depending upon the differentiating between the different users based on the identifier and the indicated service profile; and
  - determining routing for transmission and/or receipt of packets for the different users depending upon the differentiating between the different users based on the identifier, the indicated service profile, and the associated priority value, including evaluating the conditions designated by the filter criteria included in the indicated service profile and, based on the evaluating, sending a session initiation protocol message to a particular application server and instructing the particular application server to return the session initiation protocol message when the particular application server finishes processing the session initiation protocol message.

16. The apparatus of claim 15, wherein the identifier upon which the differentiating between different users is based is include in a packet header.

17. The apparatus of claim 16, wherein for a message originating at the aggregate endpoint, the identifier is placed into the packet header by the aggregate endpoint.

18. The apparatus of claim 16, wherein for a message originating at the aggregate endpoint, the identifier is paced in the packet header by an entry point into the network.

19. The apparatus of claim 16, wherein for a message originating at the aggregate endpoint, the identifier is placed into the packet header by an application server.

20. The apparatus of claim 16, wherein for a message terminating at the aggregate endpoint, the identifier is included in the packet header at an application server.

\* \* \* \* \*